Oct. 25, 1960   B. E. NELSON ET AL   2,957,189
PIPE CLEANING PIG

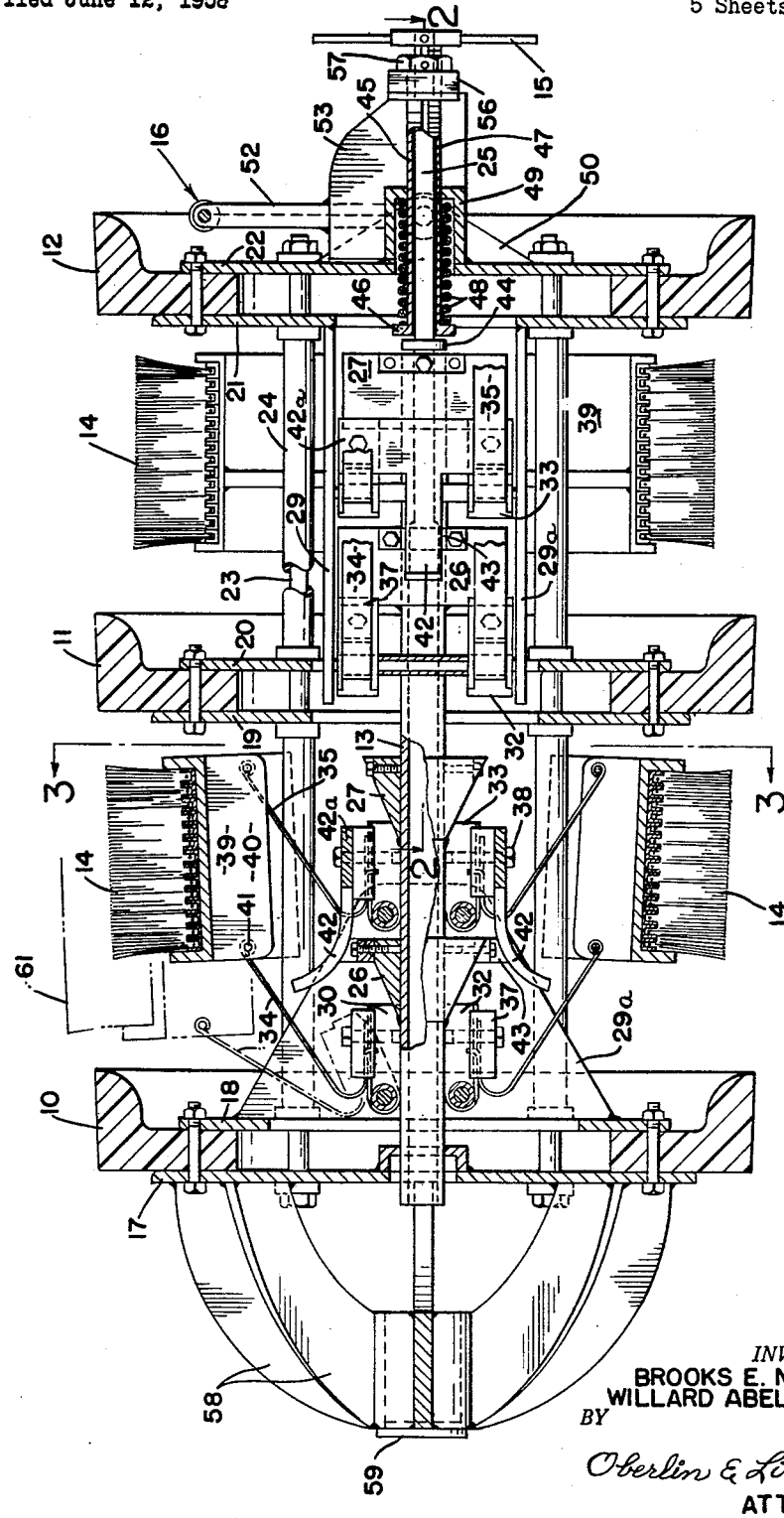

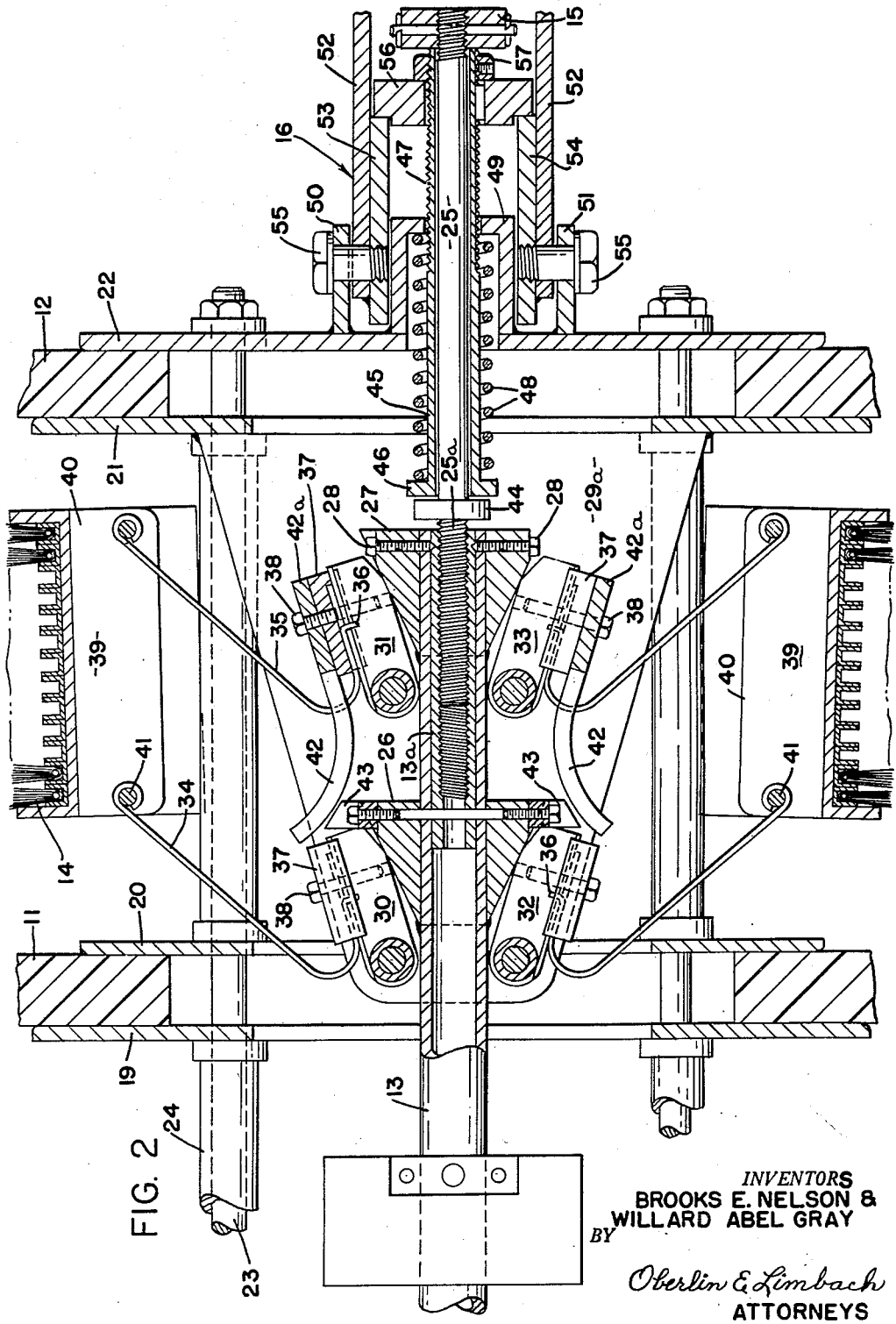

Filed June 12, 1958   5 Sheets-Sheet 3

INVENTORS
BROOKS E. NELSON &
WILLARD ABEL GRAY
BY
Oberlin E. Limbach
ATTORNEYS

INVENTORS
BROOKS E. NELSON &
WILLARD ABEL GRAY
BY
Oberlin E Limbach
ATTORNEYS

INVENTORS
BROOKS E. NELSON &
WILLARD ABEL GRAY
BY
Oberlin & Limbach
ATTORNEYS

United States Patent Office 2,957,189
Patented Oct. 25, 1960

2,957,189
PIPE CLEANING PIG

Brooks E. Nelson, Chagrin Falls, and Willard Abel Gray, Rocky River, Ohio, assignors to The Osborn Manufacturing Company, Cleveland, Ohio, a corporation of Ohio Filed June 12, 1958, Ser. No. 741,492

10 Claims. (Cl. 15—104.06)

The present invention relates to cleaning or brushing apparatus and, more particularly, to a scraper or "pig" for a pipe line.

In operating large gas transmission lines, some of which are nearly three feet in diameter, a soft carbonaceous deposit slowly accumulates on the interior of the pipe. This deposit produces sufficient friction to the flow of gas, which may for example be under 800 pounds pressure, that considerable additional work is required by the pumps. A pig or scraper is accordingly placed in the pipe line and forced through it by the flow of fluid in the line to clean the interior wall of the pipe. Similar pigs are also used in oil transmission lines where deposits of gum accumulate on the interior of the pipe line.

Such pigs or scrapers are subject to several objections in actual operation. It will be apparent that in order for the scraper to perform efficiently, the cleaning or brushing means thereof must rub against the interior of a pipe line with sufficient force to scrape away any and all accumulations. To accomplish this, brushes, for example, are set sufficiently away from the body of the scraper that the brush bristles fairly firmly press against the interior wall of the pipe line. Thus, the overall diameter of a scraper or pig should be at least equal to and may actually exceed that of the pipe line itself (since the brush bristle material is capable of yielding). This makes insertion of the scraper into the line a rather difficult and onerous task, which is not facilitated by the fact that the scraper may weigh several hundred pounds or more.

Additionally, if the pig is to perform its function adequately some wear of the brushes is unavoidable. In many pigs the brush wear is uneven so that after a period of use less than the total brush area is actually brushing the pipe line with a resultant loss of cleaning efficiency. Moreover, as brush wear continues the brush means cannot always be readily adjusted to compensate for the wear.

The scraper or pig of the present invention obviates the described objections. In our new pig the brush means can be accurately positioned with respect to the body of the pig for efficient brushing action and then easily and quickly retracted or collapsed to permit easy insertion of the scraper in a pipe line. Following this insertion, the brushes are similarly easily returned to the same preadjusted brushing position so that efficient brushing action is achieved. In addition, in our new pig means are preferably included to shift brushes and the like in a continuously substantially parallel relation to a longitudinal axis of the scraper. In this manner all or a major portion of the brushing area is always effective for cleaning action. Such movement of the brushes may also be readily and finely adjusted in our pig to compensate for brush wear.

It is, therefore, a principal object of the present invention to provide an improved brushing device.

Another object is to provide an improved scraper or pig for a pipe line and the like.

A further object is to provide a pipe line pig in which brush means may be adjusted to a desired cleaning position and then temporarily retracted or collapsed from such position to permit easy insertion of the scraper into a pipe line.

A still further object is to provide a brushing device in which brushes are moved radially with respect to the body of the device while being maintained substantially parallel to the longitudinal axis of the device to ensure uniform brush wear.

A still further object is to provide a brushing device in which the brushes are adapted to be readily and finely adjusted radially of the apparatus to compensate for brush wear.

Additional objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and dislosure illustrating, however, but one or more of the various ways in which the invention may be practiced.

In said annexed drawing:

Fig. 1 is a longitudinal cross-section of a pig embodying the present invention;

Fig. 2 is an enlarged fragmentary longitudinal cross-section of our new device taken on the line 2—2 of Fig. 1, showing the brushes shifted to an outward or operative position;

Figure 4:
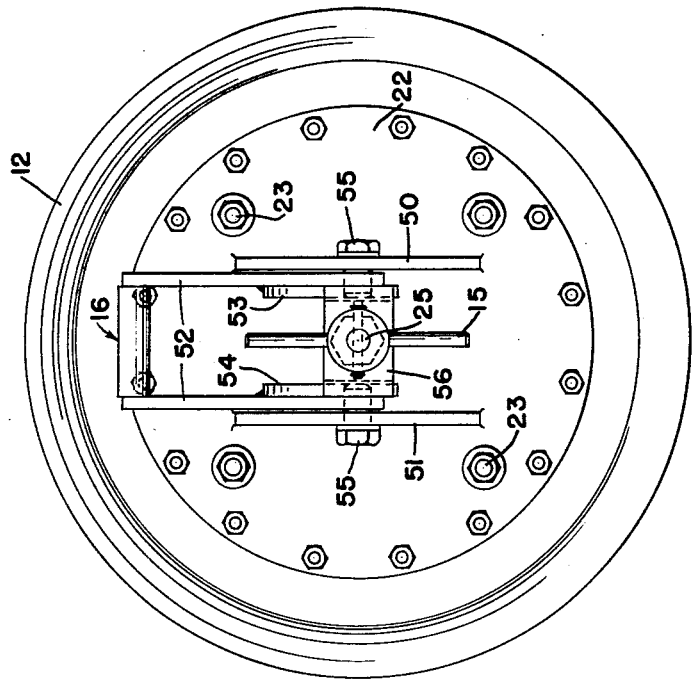
Fig. 4 is a right-hand end view of Fig. 1.
Figure 3:
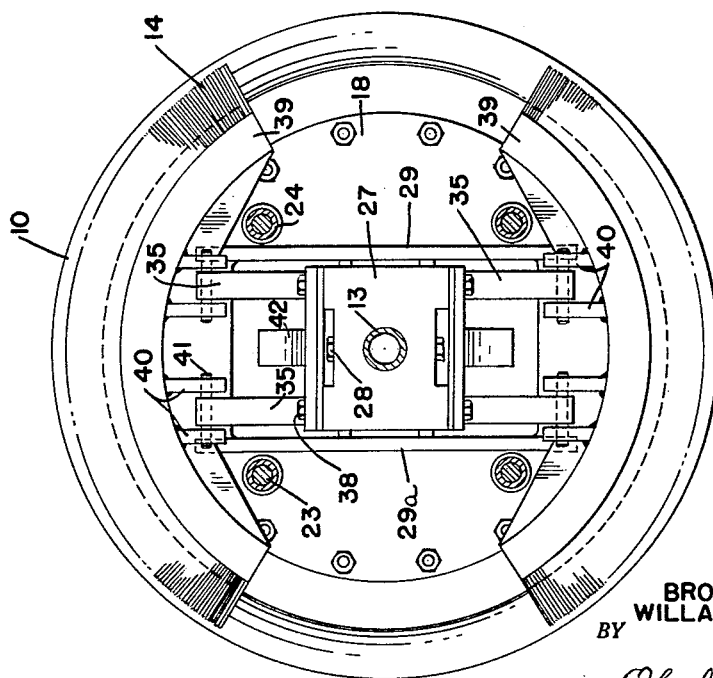
Fig. 3 is a section of Fig. 1 on the line 3—3.
Figure 5:
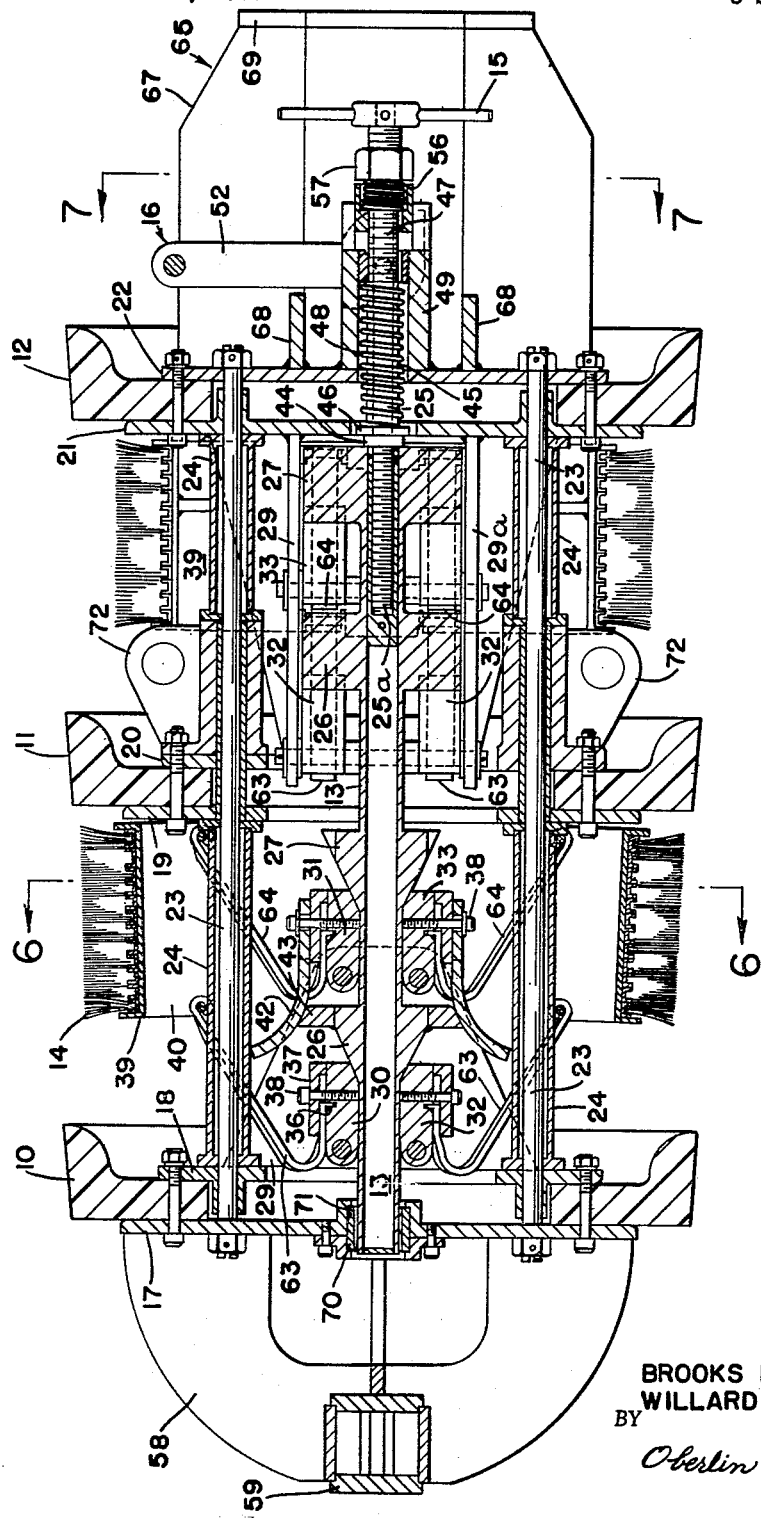
Figure 6:
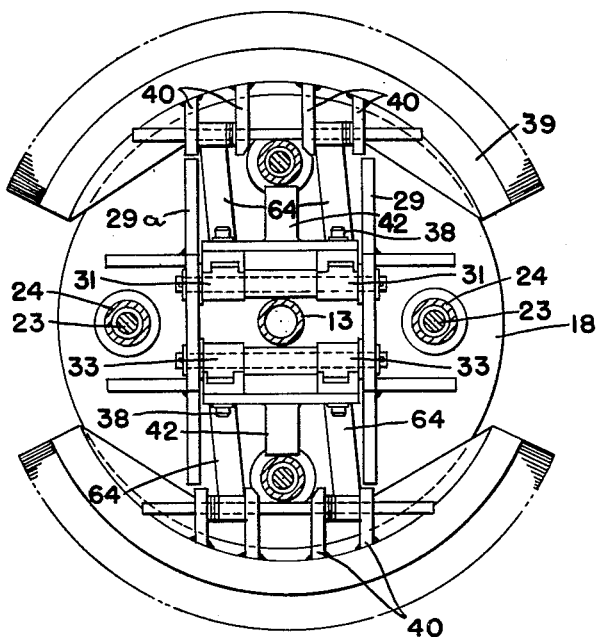
Figure 7:
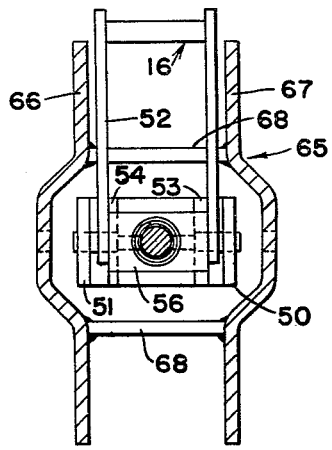

Fig. 5 is a longitudinal cross-section of a modified pig or scraper of the present invention; and Figs. 6 and 7 are sections of Fig. 5 on the lines 6—6 and 7—7, respectively.

Referring now more particularly to the drawing, the principal parts of the embodiment illustrated include cups, pistons or rings 10, 11, and 12, a shaft 13 adapted for axial movement through the rings, a plurality of brushes 14 disposed about the shaft for radial adjustment with respect to the shaft 13 and in response to axial movement thereof, a handle 15 for precise accurate axial positioning of the shaft 13, and a cam handle 16 for quick and extensive movement of the shaft and brushes.

In greater detail, the ring members or annular discs 10, 11, 12 are each reinforced by metal plates or discs 17—22, two of which are bolted to opposite sides of each ring member. These ring or cup members may be composed of rubber, Neoprene, and the like, the latter being preferred when scraping or wiping pipes conducting petroleum because of Neoprene's resistance to attack from petroleum fractions. A certain amount of free play is provided for the center pair of the plates 19 and 20 to assist the scraper in traversing curved portions of a pipe line.

The plates 17—22 have openings to pass rods 23 nested within spacer tubes 24, the ends of the rods 23 being fixed as by threaded nuts relatively to the two end plates 17 and 22 to maintain the ring members 10, 11, and 12 in spaced apart and coaxial relationship.

The plates 17—22 also have openings to pass the shaft 13 which with its shaft extension 25 extends from the front plate 17 rearwardly through the end plate 22 to terminate in the handle 15. Considering the structure disposed between the ring members 11 and 12, shown enlarged in Fig. 2, a pair of cams 26 and 27 have openings to pass the shaft 13 and are fixed thereto by stub bolts 28. These cams are wedge shaped with the tapered or divergent sides extending in a direction rearwardly of the device and on opposite sides of the shaft 13. Plate 21 has two longitudinally extending parallel bracket plates 29 and 29a between which eight blocks 30—30, 31—31, 32—32, 33—33 are pivotally mounted. All of the blocks are disposed in proximity to the shaft 13 and may if desired ride on the shaft. The blocks are arranged in sets of two, the blocks of each set being aligned axially along the shaft 13 with the remaining sets similarly aligned but indexed approximately 90° circumferentially of the shaft. In this manner blocks 30—30 and 32—32 engage the opposed flat sides of cam 26, while blocks 31—31 and 33—33 engage the flat sides of cam 27.

Each block receives the folded end of a forward leaf spring 34—34 or a rearward leaf spring 35—35 which are substantially of the same length. Each block has a slot, as indicated, in which a short bent flange 36 of the folded end of a spring is inserted. A saddle piece 37 overlies the folded leaf spring ends and a fastener 38 secures the parts together. The leaf springs 34 and 35 resiliently support the brushes 14 and do not normally bend but act as links or lever arms bending only when subjected to abnormal forces. An arcuate brush holder 39, describing an arc of about 120°, is carried circumferentially about the shaft 13 so as to conform to the inner periphery of a pipe line. Each brush holder 39 has depending lugs 40 joined by a pin 41 to receive each of the four leaf springs extending from an aligned set of blocks. The brushes 14 are suitably secured to the curved surface of a brush holder 39 in any conventional manner. For example, brush strip may be welded or clamped to such curved surface. The brushes 14 may be composed of any of the usual materials, such as Tampico fiber, nylon, plastic coated glass fiber, or wire bristles, the latter being preferred for the cleaning of pipes. The cam means so far described are operative to rock the brush holders 39 outwardly. In order positively to retract or withdraw the brush holders and their brushes 14, the rearward blocks 31—31 and 33—33 each have a curved arm 42 provided with a wider end plate 42a which is secured to the block assembly by the fasteners 38. The arm 42 cooperates with a cam 43 carried by the forward cam 26 when shaft 13 is shifted rearwardly.

The structure disposed between the ring members 10 and 11 is similar to that just described except that cams like those designated by the reference numerals 26 and 27 are displaced 90° about the shaft 13 from the latter. As a result, all the brushes 14 combine to provide a brushing action for the entire 360° about the pig. Plate 18 carries the bracket plates 29 and 29a in the manner of plate 21. In view of the similarity of parts, like numbers are used to designate the corresponding parts of the structure between the front and middle ring member 10 and 11.

As previously indicated, the cam shaft 13 is mounted for axial movement. In the present pig such movement is afforded by two different devices, one of which moves the shaft through minute controllable distances and the other of which moves the shaft rapidly and for a substantial distance. Considering the fine adjusting means initially, the shaft 13 end-engages an externally threaded cylindrical insert portion 25a of a shaft extension 25, the insert portion rotatably and adjustably fitting within a sleeve 13a. A flange 44 on the shaft extension limits the extent of travel into the sleeve 13a. The handle 15 is suitably fixed to the end of the shaft extension 25, as by a pin.

The structure for effecting a rapid and extensive reciprocation of the shaft 13 includes a sleeve 45, concentric with the shaft extension 25, having an end flange 46 and an externally threaded end 47. A coiled spring 48 concentric about the sleeve 45 and shaft extension 25 bears at one end against the flange 46 and at the other end against an off-set housing 49 formed in the end plate 22. The latter also carries bracket plates 50 and 51 in which spaced apart sides 52 of the handle 16 are each integral with cam members 53 and 54. The sides 52 and cam members 53 and 54 are jointly journalled for rotation in the plates 50 and 51 by bolts 55. The cam members 53 and 54 bear against the sides of a rectangular cam follower 56 carried on the sleeve 45 for free longitudinal movement thereon and backed by a threaded nut 57 engaging the threaded portion 47 of the sleeve.

The nose of the pig comprises a plurality of arcuate segments or vanes 58 which are joined as by welding to the front plate 17 and joined together at a centerpiece 59. The nose is primarily to assist in the handling of the pig and to serve as a bumper when the pig is eventually ejected from a pipe line. This often occurs under such force that the pig flies several hundred feet before landing. The shape of the nose also facilitates travel of the pig around bends.

In practice, an operator moves cam handle 16 to an inoperative position such as that shown in Fig. 2 and uses handle 15 to rotate the shaft extension 25. Since shaft 13 is held against rotation by wedge cams 26 and 27 and blocks 30—30 through 33—33, which may always be in some contact even when brushes 14 are retracted as shown in Fig. 1, rotation of the shaft extension 25 thrusts shaft 13 axially forwardly or draws the shaft axially rearwardly, depending upon the direction of rotation. Upon forward reciprocation of shaft 13, cams 26 and 27 rock blocks 30 through 33 about their pivotal connections with bracket plates 29 and 29a and move brush holders 39 radially of shaft 13 to a predetermined desired brushing position, as indicated at 61 in Fig. 1. Because this setting is performed before the pig is inserted in a pipe line, the setting may be accurately determined and checked. Further, in view of the threaded connection between shaft 13 and shaft extension 25, the axial positioning of the shaft and resultant positioning of brushes 14 can be most precisely controlled and adjusted.

It will be noted that each of the blocks 30—30 through 33—33 has its own actuating cam surface, so that the blocks are uniformly and simultaneously pivoted. Since the leaf springs 34—34 and 35—35 are substantially of the same length, the brush holders 39 and brushes 14 are not swung on an arc or tilted but rather moved bodily outwardly while being maintained substantially parallel to the longitudinal axis of the pig. Accordingly, a major portion, if not all, of the brush area is presented for brushing purposes against the inside of a pipe, and the resultant brush wear is generally uniformly distributed.

When the brushes 14 are adjusted to a desired position, the pig is ready for insertion in a pipe line. The operator now moves the cam handle 16 to an operative position such as that shown in Fig. 1 to urge the cam members 53 and 54 against the follower 56 and draw the shaft extension 25 and shaft 13 rearwardly a substantial distance. During the rearward movement of the shaft 13, cam 43 engages the curved portion of the arm 42 and positively withdraws the brush holder 39 to retracted position. Also, the coiled spring 48 opposes such rearward movement and becomes compressed. When the brushes 14 are retracted, the pig is now easily inserted in a pipe line, after which the cam handle 16 is released or returned to inoperative position. The compressed spring 48 now forces the shaft extension 25 and shaft 13 forwardly once more and to exactly the same predetermined position previously selected prior to insertion of the scraper in the pipe line. Once within the pipe line, the flow of fluid carries the pig along.

It is to be appreciated that as wear occurs on the brushes 14, the described fine adjustment device for the pig can also be used to move the brush holders 39 farther out and thereby compensate for such wear and maintain a controlled pressure against the inside of a pipe. Also the amount of shaft reciprocation as well as the amount of spring compression can be adjusted by selectively positioning the threaded nut 57 along the threaded portion 47 to the sleeve 45.

Figs. 5, 6, and 7 illustrate a modified form of scraper which is similar in construction to the embodiment just described except principally for the resilient means of supporting the brush holders 39 and except for a rear bumper guard. In view of the similarity of the structure of the remaining parts, the latter are indicated by like reference numbers.

In the embodiment of Figs. 5, 6, and 7, forward leaf springs 63—63 for each of the blocks 30 and 32 and rearward leaf springs 64—64 for each of the blocks 31 and 33 have their shank portions twisted about a longitudinal axis. This causes the leaf springs to be skewed in opposite directions or, as viewed in Fig. 6, skewed to the left at the top portion there illustrated and skewed to the right at the bottom portion. The leaf springs are otherwise secured at one end to a brush holder 39 and at the other end to a block 30, 31, 32 or 33 in a similar fashion.

The effect of this structure is that as the brushes 14 and their holders 39 are compressed toward a longitudinal axis of the scraper, as by a pipe, there is not only an inward radial compression but a lateral or circumferential compression of the springs 63 and 64 about the axis of the pig. The reaction of the circumferential component of such compression against a pipe, although small, is sufficient to cause a slight rotation of the scraper with respect to the pipe upon traveling through it. The rotation need not be fast. For example, the scraper may rotate only 360° in traveling a distance as long as 1 to 5 miles. Rotation of the scraper results in more uniform wear to the ring members or cups 10, 11, and 12 and to the brushes 14.

It is customary to put 2 or 3 scrapers into a pipe line at the same time. In order to prevent damage to the adjusting mechanism at the rear of the scraper in the event more than one is used, a suitable bumper generally indicated at 65 (Figs. 5 and 7) may be used. In the embodiment illustrated, the bumper includes spaced plates 66 and 67 suitably fixed as by welding to the end plate 22. The plates 66 and 67 are outwardly offset as shown in Fig. 7 compactly to house the adjusting mechanism. Cross bars 68 and an end plate 69 reinforce the plates 66 and 67.

The embodiment of Figs. 5, 6, and 7 also includes other improvements such as a wear ring 70 carried in a seat 71 formed in the front plate 17. The ring 70 facilitates axial movement of the shaft 13. Additionally, apertured lugs 72 may be used to assist in moving the scraper to and from a point of use.

It will now be apparent that we have provided an improved brushing device particularly adapted for use as a pipe line scraper or pig in which the brush means may be adjusted to a desired brushing position, temporarily withdrawn from such position to facilitate insertion of the pig into the line, and then quickly restored within the pipe line to the pre-selected brushing position. The brushes are maintained substantially in a parallel relation to the longitudinal axis of the pig so as to wear uniformly against the inside of the pipe. Additionally, the brushes may be adjustably urged against the interior of the pipe so as to brush the pipe under substantially a constant predetermined pressure and thereby compensate for brush wear. Further, the brushes may be so resiliently mounted with respect to the scraper as to cause it to rotate about a longitudinal axis during movement through a pipe line.

Other modes of applying the principle of the invention may be employed, change being made as regards the details described, provided the features stated in any of the following claims or the equivalent of such be employed.

We therefore particularly point out and distinctly claim as our invention:

1. A brushing device for a pipe line and the like including a frame having a longitudinal axis, an annular piston member adapted to conform substantially to the interior of a pipe line and supported by said frame, said piston member being reactive to line pressure to propel the device through the pipe, a control shaft mounted on the frame for reciprocation longitudinally of said frame and through said piston member, a brush holder disposed laterally of said control shaft and pivotally carried by the annular piston member, cam means on the shaft to move the brush holder radially of said longitudinal axis upon axial movement thereof, said control shaft having a threaded portion, rotatable threaded means engaging said portion and adapted upon rotation accurately to place the shaft at a desired station and to move the brush holder radially of the shaft to a predetermined position, cam means supported by the annular piston member adapted to move the rotatable threaded means rearwardly of the apparatus and thereby withdraw the control shaft and permit retraction of the brush holder from said desired station and predetermined position, respectively, and spring means carried by said rotatable threaded means to oppose such rearward movement and adapted to return the shaft and brush holder to their adjusted positions when free of the action of said last mentioned cam means.

2. A pipe line pig including a plurality of piston members held in spaced apart and substantially coaxial relation, said piston members being adapted to contact the interior of a pipe line or the like by their peripheral edges and being reactive to line pressure to propel the pig through the pipe, a control shaft mounted with respect to said piston members for longitudinal movement generally along the coaxis thereof, brush holders disposed about the control shaft and pivotally carried by the piston members, cam means on the shaft to move the brush holders radially of said coaxis upon forward axial movement of said control shaft, said shaft terminating in a threaded portion, a rotatable shaft extension engaging said threaded portion and adapted upon rotation to place the shaft at a desired axial station and to move the brush holders radially of said coaxis to a predetermined position, a cam follower about the shaft extension and having effective rearward thrust engagement therewith, cam means carried by a piston member and movable between an inoperative and operative position, said last mentioned cam means engaging the cam follower in the operative position to move the shaft and shaft extension rearwardly of the apparatus and thereby withdraw said control shaft and permit retraction of the brush holders from said desired station and predetermined position, respectively, abutment means disposed forwardly along the shaft extension and having forward thrust engagement therewith, and a coil spring disposed about the shaft extension to oppose such rearward movement and return the shaft and brush holders to their adjusted positions when said last mentioned cam means is in the inoperative position, said coil spring being disposed to react between said abutment means and piston member.

3. The pipe line pig of claim 2 further including a sleeve telescoping said shaft extension and carrying said cam follower and abutment means, and wherein said coil spring surrounds said sleeve and bears at one end against the abutment means and at the other end against a piston member through which the sleeve extends.

4. The pipe line pig of claim 2 further including a sleeve telescoping said shaft extension and carrying said cam follower and abutment means, said sleeve having an externally threaded portion and a nut engaging said portion to back the cam follower, whereby adjustment of the nut along the threaded portion positions the cam follower and varies the extent of the longitudinal movement of the shaft by said last mentioned cam means, and wherein said coil spring surrounds said sleeve and bears at one end against the abutment means and at the other end against a piston member through which the sleeve extends.

5. A brushing device for a pipe line and the like comprising a frame having a longitudinal axis, a circular piston member adapted to engage the interior periphery of a pipe line and carried by said frame, said piston member being reactive to line pressure to propel the device through the pipe, a control shaft mounted on said frame for reciprocation longitudinally of said frame through said piston member, a pair of blocks pivotally mounted on said frame in contiguous relation to said control shaft and in axial alignment therealong, an arcuate brush holder, a leaf spring fixed to each block and pivotally joined to said holder resiliently to support the holder, and cam means on said control shaft to engage each block upon longitudinal movement of said shaft and uniformly pivot said blocks radially outwardly of said longitudinal axis to station the brush holder in a desired brushing position, said leaf springs maintaining the brush holder in substantially parallel relation with the shaft to provide uniform brush wear against the pipe line.

6. A pipe line pig including a frame having a longitudinal axis, a plurality of piston members carried by said frame in spaced apart substantially coaxial relation, said members adapted to contact the interior of a pipe line or the like by their peripheral edges and being reactive to line pressure to propel the pig through the pipe, a control shaft mounted on said frame for longitudinal movement through the piston members, a plurality of blocks pivotally carried by at least one piston member in contiguous relation to said control shaft, at least two of said blocks being substantially axially aligned along said shaft, an arcuate brush holder disposed over said axially aligned blocks and substantially conforming with the curvature of the pipe line, a folded leaf spring secured adjacent one end to each of said aligned blocks and pivotally attached adjacent the other end to the brush holder, a cam on the control shaft to engage and pivot uniformly each of said aligned blocks, means to move the control shaft longitudinally to control the extent of said uniform pivoting and thereby station the brush holder in a predetermined position, said leaf springs maintaining the brush holder in a substantial parallel relation with the shaft by said uniform pivoting to provide uniform brush wear, and said means to move the shaft longitudinally compensating for such uniform wear by controlling the extent of said block pivoting.

7. A brushing device for a pipe line and the like comprising a frame having a longitudinal axis, a circular piston member adapted to engage the interior periphery of a pipe line and carried by said frame, said piston member being reactive to line pressure to propel the device through the pipe, a control shaft mounted on said frame for reciprocation longitudinally of said frame through said piston member, a pair of blocks pivotally mounted on said frame in contiguous relation to said control shaft and in axial alignment therealong, an arcuate brush holder, a leaf spring fixed to each block and pivotally joined to said holder resiliently to support the holder, cam means on said control shaft to engage each block upon longitudinal movement of said shaft and uniformly pivot said blocks radially outwardly of said longitudinal axis to station the brush holder in a desired brushing position, said leaf springs maintaining the brush holder in substantially parallel relation with the shaft to provide uniform brush wear against the pipe line; adjusting means operable to locate the shaft at a desired axial station relative to the frame and place the brush means at a predetermined radial position to brush said interior periphery of a pipe line, resilient means resisting movement of the shaft from said desired axial station, and a cam pivotally mounted on said frame engageable with the shaft to withdraw it from said axial station and permit retraction of the brush means to permit easy insertion of the apparatus in a pipe line, said resilient means returning the shaft and brush means to said desired station and predetermined position, respectively, within the pipe line upon release of said cam.

8. A pipe line pig including a frame having a longitudinal axis, a plurality of piston members carried by said frame in spaced apart substantially coaxial relation, said members adapted to contact the interior of a pipe line or the like by their peripheral edges and being reactive to line pressure to propel the pig through a pipe, a control shaft mounted on said frame for longitudinal movement through the piston members, a plurality of blocks pivotally carried by at least one piston member in contiguous relation to said control shaft, at least two of said blocks being substantially axially aligned along said shaft, an arcuate brush holder disposed over said axially aligned blocks and substantially conforming with the curvature of the pipe line, a folded leaf spring secured adjacent one end to each of said aligned blocks and pivotally attached adjacent the other end to the brush holder, a cam on the control shaft to engage and pivot uniformly each of said aligned blocks, means to move the control shaft longitudinally to control the extent of said uniform pivoting and thereby station the brush holder in a predetermined position, said leaf springs maintaining the brush holder in a substantial parallel relation with the shaft by said unform pivoting to provide uniform brush wear, said means to move the shaft longitudinally compensating for such uniform wear by controlling the extent of said block pivoting, means to move the shaft forwardly of the device through minute controllable distances to space the brush means at a desired radial distance from such axis, cam means on the frame to engage the shaft and move it sufficiently rearwardly of said adjusted forward position to permit collapse of the brush means toward such axis, and resilient means supported relatively to the shaft and engageable with said frame to oppose such rearward movement and return the shaft to said forward adjusted position upon release of said last mentioned cam means.

9. In a brushing device for a pipe line and the like comprising a frame having a longitudinal axis, a control member mounted for reciprocation longitudinally of said frame, a block member pivotally supported on said frame adjacent said control member, brush means to engage the interior of the pipe, compressible resilient means supporting the brush means on the block member, cam means on said control member to pivot the block member upon longitudinal movement of said control member and reciprocate the brush means radially of said longitudinal axis, said resilient support means being compressible radially inwardly and circumferentially of said longitudinal axis to provide a reactive force operable to rotate the frame relatively to the pipe line in traveling therethrough.

10. In a brushing device for a pipe line and the like comprising a frame having a longitudinal axis, a control member carried by said frame for longitudinal movement thereof, a block pivotally mounted on said frame and stationed adjacent said control member, a brush holder, a leaf spring attached to the block and pivotally secured to the brush holder, cam means on said control member engageable with the block and responsive to longitudinal movement of said control member to pivot the block radially outwardly of said longitudinal axis and place the brush holder in a brushing position, said leaf springs having shank portions twisted about a longitudinal axis to displace the brush holder circumferentially of said longitudinal axis upon inward radial compression thereof and thereby provide a reactive force operable to rotate the frame relatively to the pipe line in traveling therethrough.

References Cited in the file of this patent

UNITED STATES PATENTS

| | | |
|---|---|---|
| 152,766 | Priest et al. | July 7, 1874 |
| 582,953 | Robeson et al. | May 18, 1897 |
| 728,085 | Cruzan | May 12, 1903 |

(Other references on following page)

UNITED STATES PATENTS

| | | |
|---|---|---|
| 1,040,088 | Wright et al. | Oct. 1, 1912 |
| 1,074,875 | Knoke | Oct. 7, 1913 |
| 1,097,418 | Fuchs et al. | May 19, 1914 |
| 1,554,760 | Restel | Sept. 22, 1925 |
| 1,631,562 | Thompson et al. | June 7, 1927 |
| 2,392,144 | Hall | Jan. 1, 1946 |

FOREIGN PATENTS

| | | |
|---|---|---|
| 14,248 | Denmark | Feb. 9, 1911 |
| 113,386 | Germany | Aug. 18, 1899 |
| 150,433 | Sweden | June 21, 1955 |